United States Patent
Schultz et al.

(10) Patent No.: US 8,649,099 B2
(45) Date of Patent: Feb. 11, 2014

(54) PRISMATIC MULTIPLE WAVEGUIDE FOR NEAR-EYE DISPLAY

(75) Inventors: Robert J. Schultz, Farmington, NY (US); Nathan E. Burdick, Rochester, NY (US)

(73) Assignee: Vuzix Corporation, Rochester, NY (US)

( * ) Notice: Subject to any disclaimer, the term of this patent is extended or adjusted under 35 U.S.C. 154(b) by 0 days.

(21) Appl. No.: 13/231,628

(22) Filed: Sep. 13, 2011

(65) Prior Publication Data

US 2012/0062998 A1    Mar. 15, 2012

Related U.S. Application Data

(60) Provisional application No. 61/382,224, filed on Sep. 13, 2010.

(51) Int. Cl.
  *G02B 27/14*    (2006.01)
(52) U.S. Cl.
  USPC ........................................... 359/630
(58) Field of Classification Search
  USPC ........................... 359/20, 629–633
  See application file for complete search history.

(56) References Cited

U.S. PATENT DOCUMENTS

| | | |
|---|---|---|
| 7,205,960 B2 | 4/2007 | David |
| 7,418,170 B2 | 8/2008 | Mukawa et al. |
| 7,573,640 B2 | 8/2009 | Nivon et al. |
| 2009/0015929 A1 | 1/2009 | DeJong et al. |
| 2010/0220295 A1* | 9/2010 | Mukawa et al. ............... 353/20 |

* cited by examiner

*Primary Examiner* — Ricky Mack
*Assistant Examiner* — Daniele Manikeu
(74) *Attorney, Agent, or Firm* — Brian B. Shaw, Esq.; Thomas B. Ryan, Patent Agent; Harter Secrest & Emery LLP

(57) ABSTRACT

A near-eye display includes a compound waveguide for presenting viewers with virtual images visible within an eyebox at a limited relief distance from the compound waveguide. The compound waveguide is assembled from a plurality of waveguides that are at least partially optically isolated for conveying different portions of the virtual image. An input couple injects the different portions of the virtual image into predetermined combinations of the waveguides, and an output coupling ejects the different portions of the virtual image from the waveguides toward the eyebox in a form that at least partially constructs a pupil within the eyebox.

25 Claims, 8 Drawing Sheets

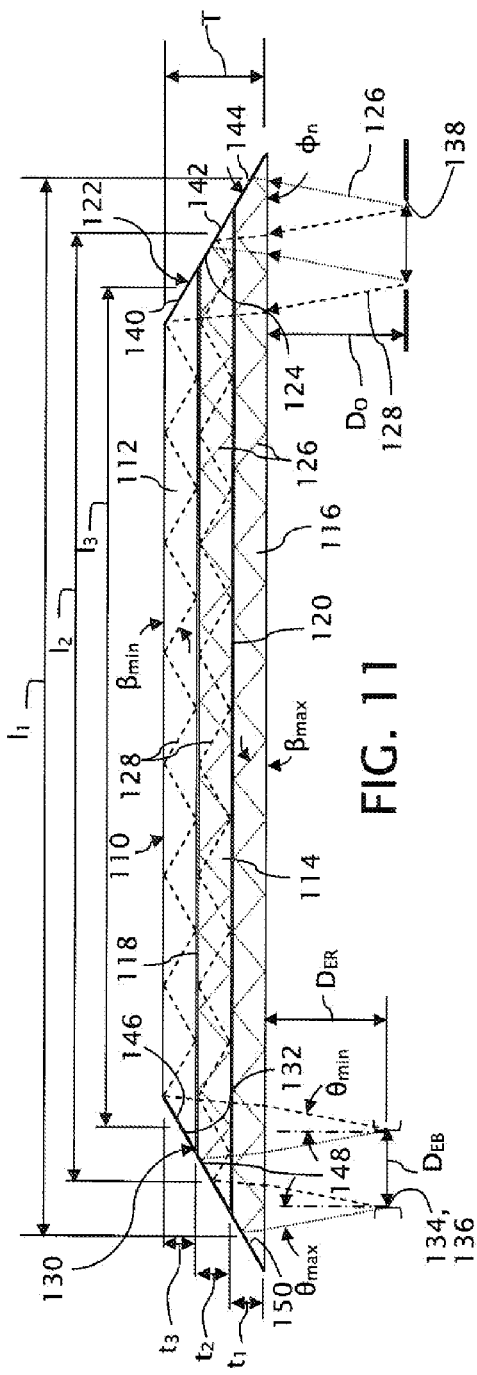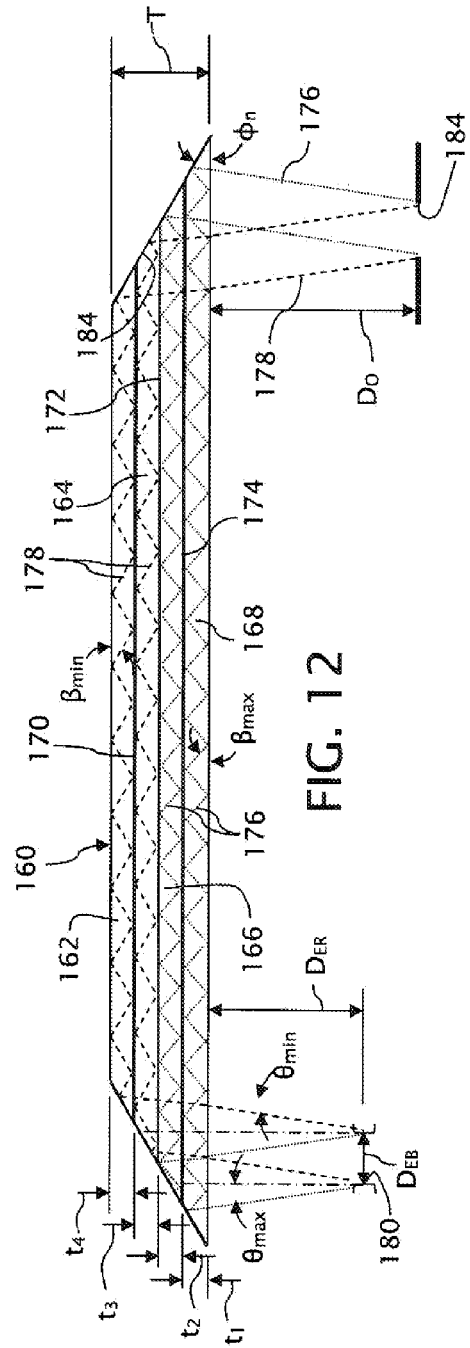

PRISMATIC MULTIPLE WAVEGUIDE FOR NEAR-EYE DISPLAY

TECHNICAL FIELD

The invention relates to near-eye displays that include waveguides for conveying image information in a compact form to viewers' eyes, particularly as information for forming virtual images within viewers' eyes.

BACKGROUND OF THE INVENTION

Waveguides of near-eye displays convey image information toward viewers' eyes from positions outside the viewers' fields of view. The image information conveyed by many such waveguides has an angularly encoded form for projecting virtual images into the viewers' eyes. The near-eye displays present the image information to the viewers within viewing pupils (also referred to as "eyeboxes"), which when aligned with the pupils of the viewers' eyes produce virtual images within the viewer's fields of view.

The image information originates outside the viewers' fields of view in positions such as along the temples of eyeglass frames. Electronic video display data is converted into the image information by optical pattern generators, such as spatial light modulators, combined with focusing optics that angularly transform the spatial patterns or by scanning optics that directly generate angular transforms of spatial patterns.

The waveguides, which can be mounted within the frame fronts of eyeglass frames in place of or in addition to eyeglass lenses, convey the image information from outside the viewers' fields of view into the viewers' fields of view in a form that minimizes the thicknesses of the near-eye displays in front of the viewers' eyes. The waveguides, at least as a goal, occupy limited volumes of space corresponding to the space within which eyeglass lenses are normally held within the eyeglass frames. That is, the waveguides are preferably limited in thickness (i.e., depth) for more closely resembling the dimensions of conventional eyewear.

The waveguides, which generally take the form of transmissive plane-parallel plates, incorporate or are otherwise associated with both input couplings for directing light into the waveguides and output couplings for directing light out of the waveguides in a direction generally along the viewers' lines of sight. Generally, light representing individual pixels within the intended virtual images enters the waveguides through the input couplings in a substantially collimated form distinguished from other pixels within the intended virtual images by vertical and horizontal angles of origin (i.e., the angles through which the chief rays enter the aperture). In many of these waveguides, the collimated beam components (i.e., beamlets) that contribute to the vertical dimension of the virtual images propagate substantially without interruption and converge toward the viewing pupils. However, the collimated beam components (i.e., beamlets) that contribute to the horizontal dimension of the virtual images typically propagate through internal reflections between anterior and posterior surfaces of the waveguides, generally preserving the collimated form of the propagating beam components (beamlets). The output couplings redirect the propagating beamlets out of the waveguides and into the viewers' lines of sight forming the viewing pupils.

The waveguides generally support the propagation of the beamlets for forming the horizontal dimension of the virtual images by total internal reflection. As such, the waveguides can remain substantially transparent to provide unobstructed views of the ambient environment. However, the incidence angles supporting the internal reflections are limited to angles above the so-called "critical angle", which is the minimum incidence angle at which total internal reflection is supported.

The input and output couplings direct the collimated beamlets into and out of the waveguides over a range of angles corresponding to the angular field of view. For example, the two ends of the waveguides can be fashioned as at least partially reflective prismatic facets that are inclined to the direction of light propagation along the waveguides for reflecting collimated beamlets over a range of angles into and out of the displays.

However, the reflective facets, which must be oversized to fill limited size eyeboxes, tend to direct significant portions of the light beyond the eyeboxes. Beamlets exiting the waveguides at field angles associated with one side of the intended image extend into areas at one side of the eyebox, and beamlets exiting the waveguides at field angles associated with the other side of the intended image extend into areas at the other side of the eyebox. That is, although the waveguides limit the spatial separation between collimated beamlets reflecting within the waveguides at different angles of incidence, the beamlets spatially separate after reflection from exit prism facet through an eye relief distance to the eyebox. Unless optical power is also used, which complicates other matters including vision through the waveguide and chromatic correction, the horizontal dimension of the optical pupil degrades over the distance from the reflective facets to the eyebox.

Diffractive or holographic input and output couplings have also been used to couple light into and out of near-eye display waveguides. However, the diffractive or holographic couplings tend to be chromatically sensitive and special compensations are required to compensate.

Waveguides for near-eye displays have been formed in multiple layers for purposes of homogenization. The interface between layers functions as a beamsplitter or partial reflector for splitting incident beams into two separate beams on each encounter. One portion of the incident beam is reflected within the same layer and another portion of the incident beam is transmitted into another layer. The effect is to widen the initial beam manifest as a lateral displacement of beam portions propagating along the waveguide. Departures from parallelism between the layers can produce cumulative errors in the propagation of beam image components.

Multiple waveguides have been used to convey different color components of virtual images. Each of the waveguides includes different pairing of diffractive optics for injecting the different color components into the waveguides and ejecting the different color components from the waveguides for assembling a color image. Each of the pairings of diffractive optics can be optimized for a different color to reduce chromatic aberrations associated with the use of color sensitive injection and ejection optics. However, each waveguide must be arranged to convey the color components across the entire image so the additional waveguides add to the thickness of the display by a multiple equal to the number of additional waveguides.

SUMMARY OF INVENTION

The invention, among its preferred embodiments, assembles a waveguide for a near-eye display from a plurality of partially autonomous waveguides. The partially autonomous waveguides overlap through a common length between input and output couplings. Each of the partially autonomous couplings propagates a range of angularly oriented beamlets conveying image information. Except at the coupling ends of the waveguides, the angularly oriented beamlets propagating along any one waveguide remain within the same waveguide isolated from the other waveguides. Each of the partially autonomous waveguides can be arranged to convey a different angular range of the beamlets. The angular ranges are distributed among the waveguides for directing more of the light within the different angle beamlets into an eyebox within which an intended virtual image can be viewed. Although composed of multiple waveguides, the overall thickness of the multiple waveguides is not appreciably more than the thickness of a single waveguide required to convey the entire angular range of beamlets and the parallelism within which the multiple waveguides must be related is limited by the prescribed optical isolation between the waveguides.

Preferably, the input and output couplings operate without contributing optical power. Nonetheless, the distribution of the different angle beamlets among the waveguides enables the different angle beamlets to converge from the output coupling to the eyebox and thereby at least partially assemble an exit pupil within the eyebox. Preferred embodiments of the invention improve efficiency by assuring that more of the light entering the waveguides reaches the eyebox.

One version of the invention as a near-eye display for displaying virtual images includes an image generator for generating angular transforms of the virtual images intended for display as angularly related beamlets representing different spatially related points in the images. A plurality of waveguides conveys the angularly related beamlets toward an eyebox, and these waveguides overlap along a common length. An input coupling injects the angularly related beamlets into the waveguides for propagation along the waveguides. An output coupling ejects the angularly related beamlets from the waveguides toward the eyebox. The input coupling is optically spaced from the image generator for injecting different angular ranges of the angularly related beamlets into different waveguides so that the waveguides convey different regions of the intended virtual images. The output coupling ejects the different angular ranges of the beamlets from the different waveguides on converging paths toward the eyebox into positions of increasing spatial overlap.

Preferably, the output coupling converges the different angular ranges of the beamlets toward the eyebox without contributing optical power that would otherwise affect the angular magnification of the virtual images. The image generator preferably includes an aperture within which the angular transforms of the virtual images overlap, and the optical spacing between the input coupling and the image generator positions the aperture of the image generator at an optical distance from the input coupling so that the angularly related beamlets are partially spatially separated at the input coupling. The different angular ranges of the beamlets are preferably distributed among the waveguides so that the convergence of the different angular ranges of the beamlets from the output coupling reduces the spatial separation between the angularly related beamlets within the eyebox.

The waveguides, as preferably constructed and assembled, are optically isolated from one another for propagating the angularly related beamlets through a first range of grazing angles and are optically coupled to one another through a second higher range of grazing angles. Included among the waveguides are an anterior waveguide remote from the eyebox, a posterior waveguide proximate to the eyebox, and at least one intermediate waveguide located between the anterior waveguide and the posterior waveguide.

The input coupling injects the angularly related beamlets that propagate at the lowest grazing angle into the anterior waveguide substantially without injecting the angularly related beamlets that propagate at the lowest grazing angle into the posterior waveguide, and the input coupling injects the angularly related beamlets that propagate at the highest grazing angle into the posterior waveguide substantially without injecting the angularly related beamlets that propagate at the highest grazing angle into the anterior waveguide. In addition, input coupling injects the angularly related beamlets that propagate at both the lowest grazing angle and the highest grazing angle within the at least one intermediate waveguide.

In one or more preferred embodiments each of the waveguides has a thickness between plane-parallel front and back surfaces for supporting internal reflection of the angularly related beamlets and has a length between an entrance end and an exit end. The input coupling preferably includes an at least partially reflective surface proximate to the entrance end of each of the substantially parallel waveguides, and the output coupling preferably includes an at least partially reflective surface proximate to the exit end of each of the substantially parallel waveguides.

The waveguides can vary in dimensions, such as thickness, for filling the eyebox with a more uniform distribution of light from the angularly related beamlets. At least one of the angularly related beamlets has a beam width subject to truncation by the input coupling, and the length of one of the waveguides can be set in relation to its thickness so that the truncated portion of the beam width is not required for filling the eyebox. The waveguide whose length is set in relation to its thickness is preferably the posterior waveguide within which the highest grazing angle beams are propagated.

The at least partially reflective surfaces proximate to the exit end of each of the substantially parallel waveguides are preferably oriented at a common exit angle and located within a common plane. Similarly, the at least partially reflective surfaces proximate to the entrance end of each of the substantially parallel waveguides are also preferably oriented at a common entrance angle and located within a common plane. The image generator as envisioned for one or more of the preferred embodiments generates the angular transforms of the virtual images in a plurality of colors, and the common entrance angle substantially equals the common exit angle for limiting chromatic aberrations of the virtual images.

Another version of the invention as compound waveguide system for a near-eye virtual image display includes at least three parallel waveguides each having an entrance end and an exit end. An optical medium between adjacent pairings of the parallel waveguides at least partially optically isolating the waveguides from one another. A prismatic input coupling that injects light into the parallel waveguides includes at least partially reflective surfaces at the entrance ends of the parallel waveguides, which partially reflective surfaces at the entrance ends are oriented through a common entrance angle and located in a common plane. A prismatic output coupling that ejects light from the plane parallel waveguides includes at least partially reflective surfaces at the exit ends of the parallel waveguides, which partially reflective surfaces at the exit ends are also oriented through a common exit angle and located in a common plane.

Preferably, the at least partially reflective surfaces at the exit ends of the parallel waveguides are partially transmissive, and also preferably included within the compound waveguide system is a mating prismatic waveguide extender that compensates for refractive effects associated with transmissions through the partially reflective surfaces at the exit ends of the parallel waveguides. The partially reflective surfaces of the prismatic output coupling combined with the mating prismatic waveguide extender allows a user to view the ambient environment through the prismatic output coupling without a significant shift of the view.

The waveguides preferably include front and back surfaces that extend plane-parallel to each other at a first accuracy to assure that beamlets propagate along the waveguides with substantially constant grazing angles. However, the requirement for plane parallelism between adjacent waveguides can be set at a second lower accuracy. The first accuracy is set much higher than the second accuracy because angular changes to the grazing angles of beamlets propagating within waveguides accumulate according to an arithmetic progression with the multiple reflections of the beamlets from the front and back surfaces, whereas the angular departure in parallelism between the plates has a solitary effect between similar grazing angles propagating within the different waveguides.

The plurality of parallel waveguides have a first index of refraction and the optical medium separating the plurality of parallel waveguides from one another has a second index of refraction that is preferably lower than the first index of refraction. The difference between the refractive indices of the parallel waveguides and the optical medium is preferably set to support internal reflections between the parallel front and back surfaces of the waveguides through a first range of grazing angles and transmissions between the waveguides through the second range of grazing angles. One embodiment fashions the optical medium separating the plurality of parallel waveguides as an optical adhesive that binds the parallel waveguides together.

Another version of the invention as a method of making a compound waveguide system for a near-eye virtual image display includes assembling a plurality of waveguides into a stack in a form that at least partially optically isolates the waveguides from one another. Each of the waveguides has an entrance end, an exit end, and plane parallel front and back surfaces that extend between the entrance end and the exit end. Prismatic surfaces are fashioned at the entrance ends of the waveguides so that each of the entrance ends is oriented in a common direction, and other prismatic surfaces are fashioned at the exit ends of the waveguides so that each of the exit ends is oriented in a common direction. Preferably, each of the entrance ends and each of the exit ends are fashioned together into the prismatic surfaces at the entrance and exit ends of the waveguides.

A first prismatic waveguide extender is preferably appended to the exit ends of the waveguides and a partially reflective surface is formed at an interface between the first prismatic waveguide extender and the prismatic surfaces at the exit ends of the waveguides. A second prismatic waveguide extender is preferably appended to the entrance ends of the waveguides and a partially reflective surface is formed at an interface between the second prismatic waveguide extender and the prismatic surfaces at the entrance ends of the waveguides. Both prismatic waveguide extenders preferably include front and back plane-parallel surfaces that are oriented substantially parallel to the front and back plane-parallel surfaces of the plurality of waveguides.

BRIEF DESCRIPTION OF THE DRAWING FIGURES

FIG. 11 is a diagram of a compound waveguide of a near-eye display system with individual waveguides arranged for conveying beamlets within different ranges of grazing angles for forming a pupil at the eyebox of the near-eye display system.

FIG. 12 is a diagram of an alternative compound waveguide of a near-eye display system with different grazing angle beamlets divided among different pairings of the waveguides.

DETAILED DESCRIPTION OF THE INVENTION

Figure 1:
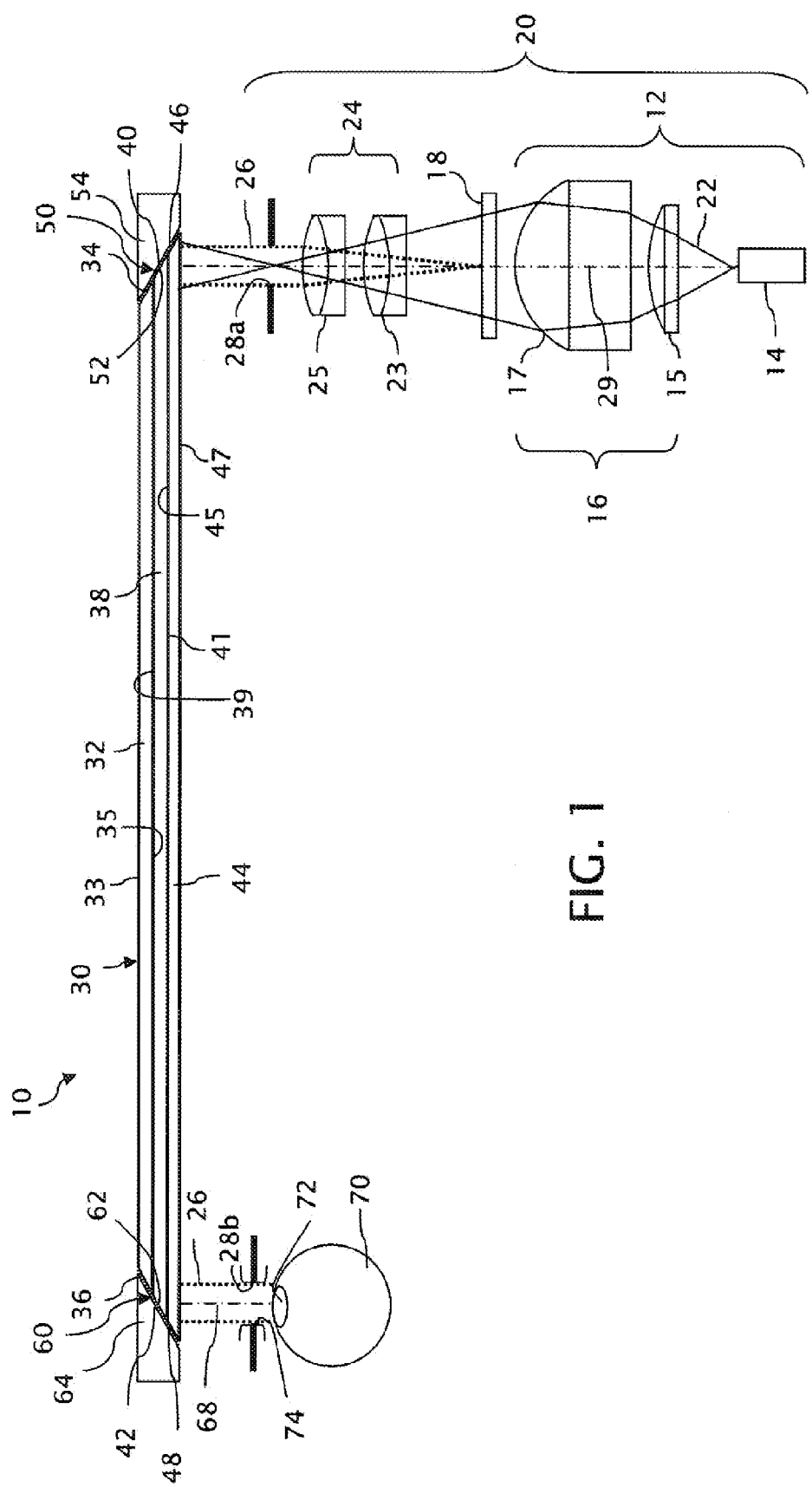
FIG. 1 is a diagram of a near-eye display system in accordance with the invention shown in a side view.

A general optical layout of a near-eye display 10 arranged in accordance with the invention is shown in FIG. 1. The near-eye display 10 includes an image generator 20 for generating angular transforms of virtual images intended for display and a compound optical waveguide 30 for conveying the output of the image generator 20 from outside a viewer's field of view into alignment with the viewer's field of view.

The image generator 20 is based on a spatial light modulator 18, which produces light patterns in accordance with a video input signal (not shown). An illuminator 12, which includes a light source 14 and a condenser 16, uniformly illuminates the spatial light modulator 18. The light source 14, which emits an expanding light beam 22, can be formed by one or more light emitting diodes or other sources including lamps known for illuminating spatial light modulators or other microdisplay engines. The condenser 16 includes one or more optical elements, such as a PCX (piano-convex) lens 15 for collecting light from the expanding beam 22 and a cylindrical lens 17 for reshaping the expanding beam 22 in one orthogonal direction with respect to another to accommodate the intended propagation of the light beam 22 within the compound waveguide 30. More particularly, the cylindrical lens 17 is oriented to confine the dimensions of the light beam 22 in the plane of FIG. 1 while allowing a further expansion of the light beam 22 in an orthogonal plane.

The spatial light modulator 18, which functions together with the illuminator 12 as a microdisplay engine, preferably comprises a controllable array of liquid crystal diodes functioning as individually addressable pixels for producing the desired light patterns within a light beam 22 in response to the video signal. Other spatial light modulators useful for purposes of the invention include grating light valve (GLV) technologies and digital light processing (DLP) technologies such as digital micromirror devices (DMD). The illuminator 12 and the spatial light modulator 18 could also be replaced by a self-illuminating microdisplay engine in which the addressable pixel elements are themselves individually controllable light sources such as known from organic light-emitting diode technologies (OLED).

An imaging lens 24 shown as doublets 23 and 25 converges the beam 22 at different rates in the orthogonal planes through respective pupils (i.e., apertures or their images) 28a and 28b to account for the different treatment of the beam 22 within the compound waveguide 30. Other adjustments known in the art can be made to the illuminator 12 to achieve desired spectral and spatial distributions of light as well as downstream energy distributions within the pupils 28a and 28b.

Figure 2:
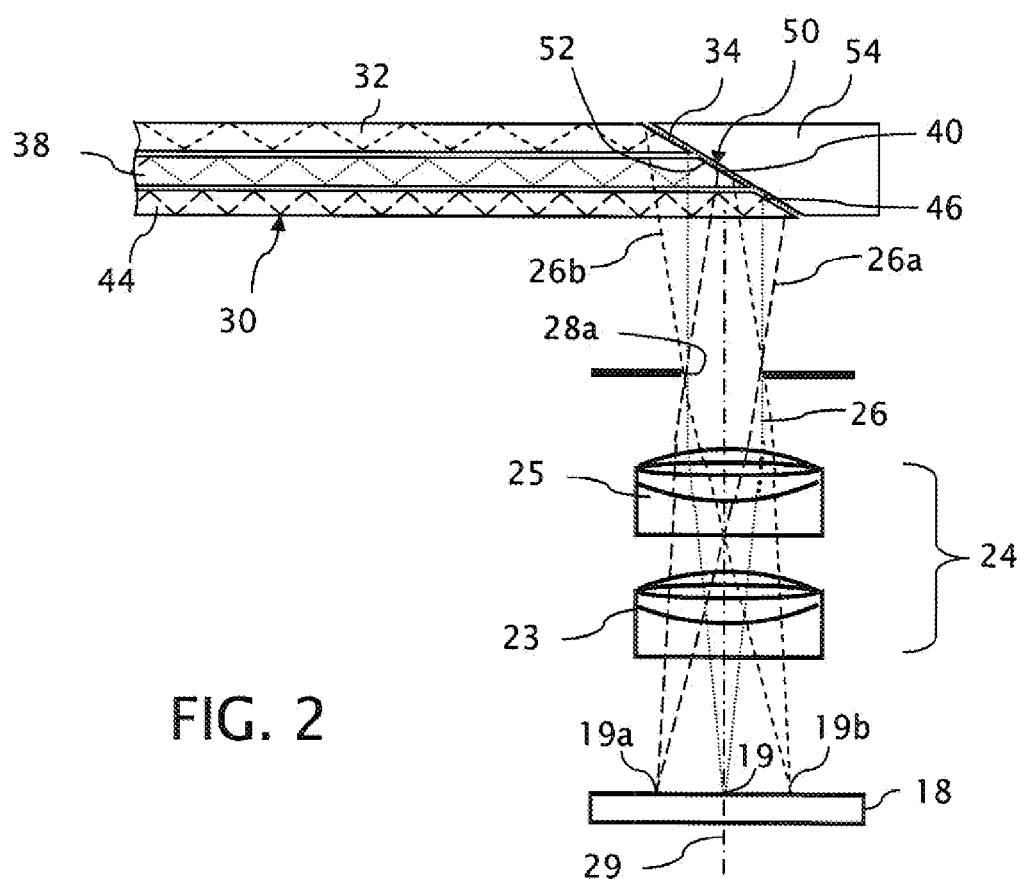
FIG. 2 is an enlarged cut-away diagram centered about an input coupling for injecting light into a compound waveguide of the near-eye display system.

Referencing FIG. 2, the imaging lens 24, as a type of focusing optic, functions largely as a collimator for converting bundles of rays emitted from individual pixels, such as the pixels 19, 19a, and 19b, of the spatial light modulator 18 into substantially collimated beamlets, such as the beamlets 26, 26a, and 26b, oriented in unique directions according to the locations of the pixels within the spatial light modulator 18. In other words, the individual pixels of the spatial light modulator 18 function substantially as point light sources, and the relative displacement of the individual pixels from an optical axis 29 of the imaging lens 24 affects the angle through which the corresponding beamlets are collimated. Within the pupils 28a and 28b, the image information from the spatial light modulator 18 is angularly transformed into a reciprocal conjugate so that the angles at which the beamlets 26, 26a, and 26b pass through the pupils 28a and 28b are representative of the positions of their pixel sources 19, 19a, and 19b in the spatial light modulator 18.

The beamlets 26, 26a, and 26b are substantially collimated for presenting a virtual image of the light pattern produced by the spatial light modulator 18 at a larger apparent size. However, the beamlets 26, 26a, and 26b preferably slightly diverge so that the virtual image produced by the imaging lens 24 appears at a finite distance, such as at two to four meters from the intended viewer, instead of at a distance approaching infinity. In addition, although the substantially collimated beamlets 26, 26a, and 26b individually slightly diverge, the orthogonal light beam components of the collimated beamlets 26 collectively converge through the respective pupils 28a and 28b.

The compound waveguide 30 is arranged for accomplishing a number of functions, including conveying the beamlets 26, 26a, and 26b to a position near an intended line of sight 68 of a viewer's eye 70 (see FIG. 1) and reorienting the beamlets 26, 26a, and 26b with respect to the intended line of sight 68. Non-immersive versions of the near-eye display 10 require preserving the line of sight 68 through the compound waveguide 30 to the ambient environment, and the depicted embodiment, as will be discussed shortly, is specially adapted to this purpose. The pupil 28b is preferably located nearly coincident with a pupil 72 of the viewer's eye 70 within an eyebox 74. Although the pupil 28a is intended to be located offset from the entrance into the compound waveguide 30, the compound waveguide 30 limits the further divergence of the beamlets 26, 26a, and 26b in the plane of FIGS. 1 and 2, and, as to be discussed shortly, is also arranged for at least partly reconstructing the pupil 28a coincident with the pupil 28b.

The compound waveguide 30 includes a plurality of at least partially autonomous parallel waveguides including an anterior waveguide 32 having an entrance end 34 and an exit end 36, an intermediate waveguide 38 having an entrance end 40 and an exit end 42, and a posterior waveguide 44 having an entrance end 46 and an exit end 48. The beamlets 26, 26a, and 26b are injected into the compound waveguide 30 through a prismatic input coupling 50 having a reflective entrance facet 52 (e.g., a polished "silvered" surface) for reflecting the beamlets 26, 26a, and 26b into predetermined combinations of the partially autonomous waveguides 32, 38, and 44.

Although the reflective entrance facet 52 could be formed directly on the entrance ends 34, 40, and 46 of the waveguides 32, 38, and 44, which are preferably all equally inclined in the same plane at a common facet angle, the reflective entrance facet 52 is formed on a mating surface of a prismatic waveguide extender 54. An index matching adhesive attaches the prismatic waveguide extender 54 to the commonly inclined entrance ends 34, 40, and 46 of the waveguides 32, 38, and 44.

An output coupling 60 having a partially reflective exit facet 62 is similarly formed at the exit ends 36, 42, and 48 of the waveguides 32, 38, and 44. The partially reflective exit facet 62, which is preferably formed as plurality of dielectric coatings on a mating surface of a prismatic waveguide extender 64, ejects the beamlets 26, 26a, and 26b from the waveguides 32, 38, and 44 on converging pathways to an eyebox 74 within which the exit pupil 28b is formed.

The waveguides 32, 38, and 44 are preferably made of a high refractive index optical material and are preferably bonded together through a lower index optical adhesive. For example, high index materials such as SF 6 optical glass from Shott North America, Inc. of Duryea, Pa. having a refractive index of approximately 1.8 can be used for the waveguides 32, 38, and 44, and lower index materials such as MY-133V5000 UV cured adhesive from My Polymers Ltd. of Moshav Beit-Elazari, Israel having a refractive index of approximately 1.33 can be used as the optical adhesive. Optical plastics, such as acrylic, polystyrene, and known copolymers can be used to other advantages for constructing the waveguides 32, 38, and 44. For example, such less expensive and lighter resin materials can be moldable for forming desired features into the waveguides and for integrating the waveguides into a larger structure, such as an eyewear frame and particularly a bridge.

Front and back surfaces 33 and 35 of the waveguide 34, front and back surfaces 39 and 41 of the waveguide 38, and front and back surfaces 45 and 47 are all preferably plane parallel surfaces. Requirements for parallelism between the front and back surfaces 33 and 35, 39 and 41, and 45 and 45 are preferably held to an accuracy of less than 10 arc seconds. However, a lower accuracy for parallelism can be tolerated between the waveguides 32, 38, and 42. For example, the parallelism between the waveguides 32, 38, and 42 can be less accurate than the parallelism between the front and back surfaces 33 and 35, 39 and 41, and 45 and 45 of the waveguides 32, 38, and 42 by a factor of 10 or more.

Figure 4:
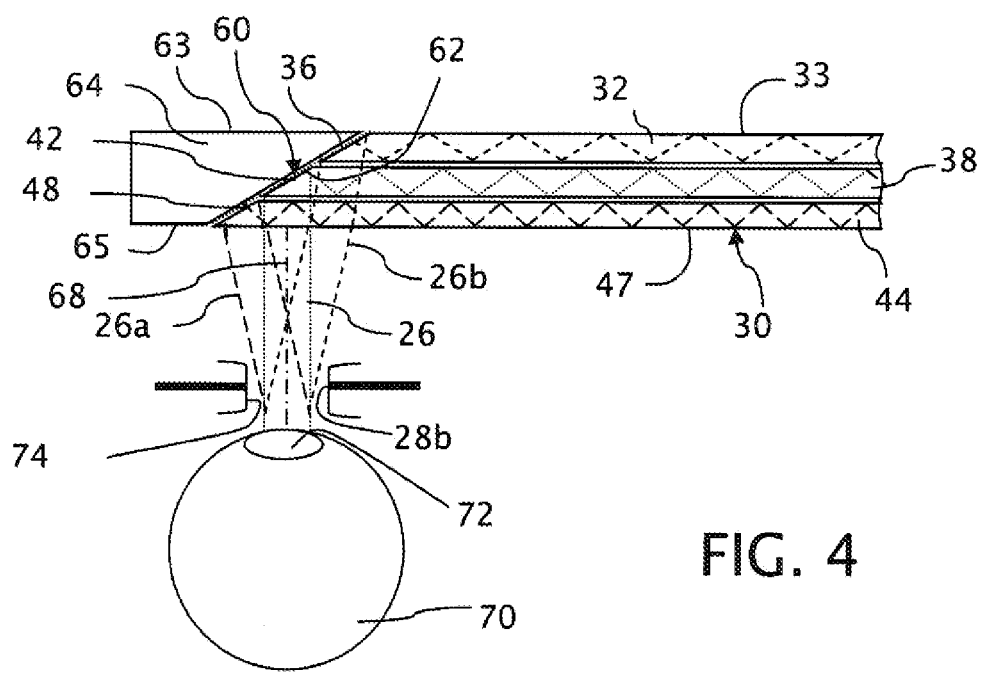
FIG. 4 is a similarly enlarged cut-away diagram centered about an output coupling for ejecting light from the compound waveguide of the near-eye display system into a viewer's eye.

As shown in FIG. 4, front and back surfaces 63 and 65 of the prismatic waveguide extender 64 also preferably extend parallel to and in alignment with the respective front surface 33 of the anterior waveguide 32 and the back surface 47 of the posterior waveguide 44. As such, the prismatic waveguide extender 64 compensates for refractive effects associated with transmissions through the partially reflective exit facet 62 from the ambient environment. Thus, the viewer has a substantially unshifted view of the ambient environment along the line of sight 68.

Figure 3:
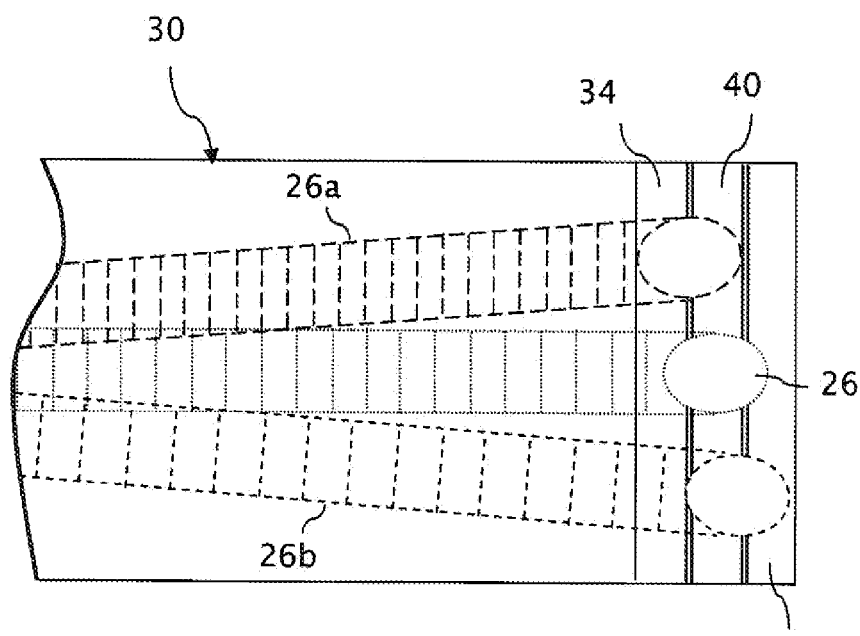
FIG. 3 is an enlarged cut-away back view of the compound waveguide and the input coupling showing the convergence of beamlets propagating in the compound waveguide within an orthogonal plane.

As especially seen in FIGS. 2 and 3, the pupil 28a of the image generator 20 through which the collimated beamlets 26, 26a, and 26b converge in the plane of the drawing is offset from the entrance facet 52 through a distance that allows the collimated beamlets 26, 26a, and 26b to partially spatially separate before encountering the entrance facet 52. As a result, the collimated beamlet 26a primarily fills the posterior waveguide 44, the collimated beamlet 26 primarily fills the intermediate waveguide 38, and the collimated beamlet 26b primarily fills the anterior waveguide 32. Although some spillover between adjacent waveguides is anticipated, the waveguides 32, 38, and 44 maintain a spatial separation between the beamlets 26, 26a, and 26b.

Figure 5:
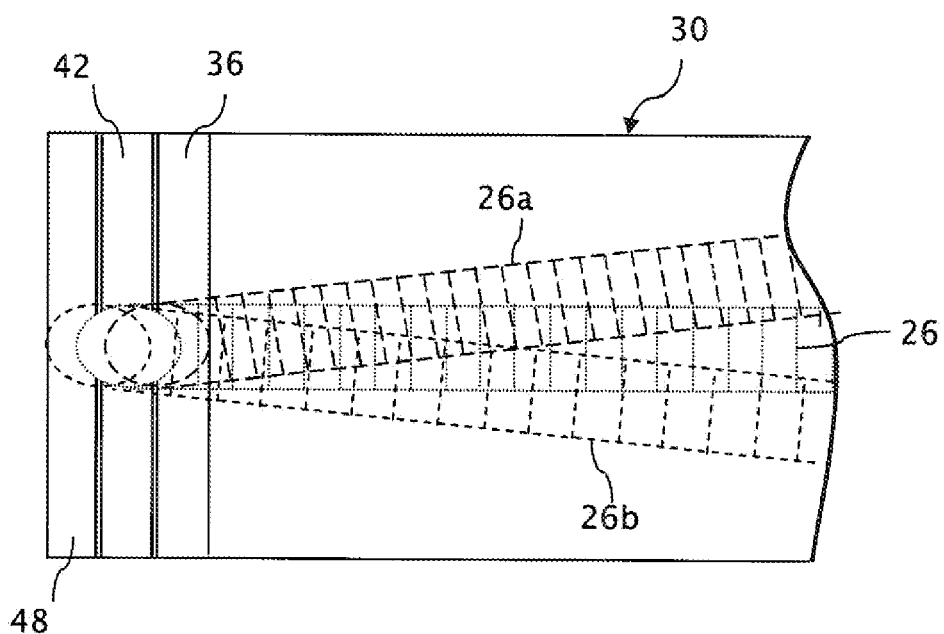
FIG. 5 is a similarly enlarged cut-away back view of the compound waveguide and the output coupling showing the convergence of beamlets at the output coupling for forming a viewing pupil.

As shown in FIGS. 4 and 5, this spatial separation is exploited at the exit facet 62 to reflect the different beamlets 26, 26a, and 26b on converging paths into the exit pupil 28b. That is, by properly spatial segregating the different angle beamlets 26, 26a, and 26b among the different waveguides 32, 38, and 44, each of the beamlets 26, 26a, and 26b exits from the compound waveguide 30 at a position through which the individual beamlets 26, 26a, and 26b are reflected toward the exit pupil 28a. Thus, without imparting any optical power, the input and output couplings 50 and 60 together with the compound waveguide 30 at least partially reconstruct the pupil 28a in the plane of FIGS. 1, 2, and 4 at the pupil 28b coincident with the convergence of the beamlets 26, 26a, and 26b in the orthogonal plane of FIGS. 3 and 5.

Figure 6:
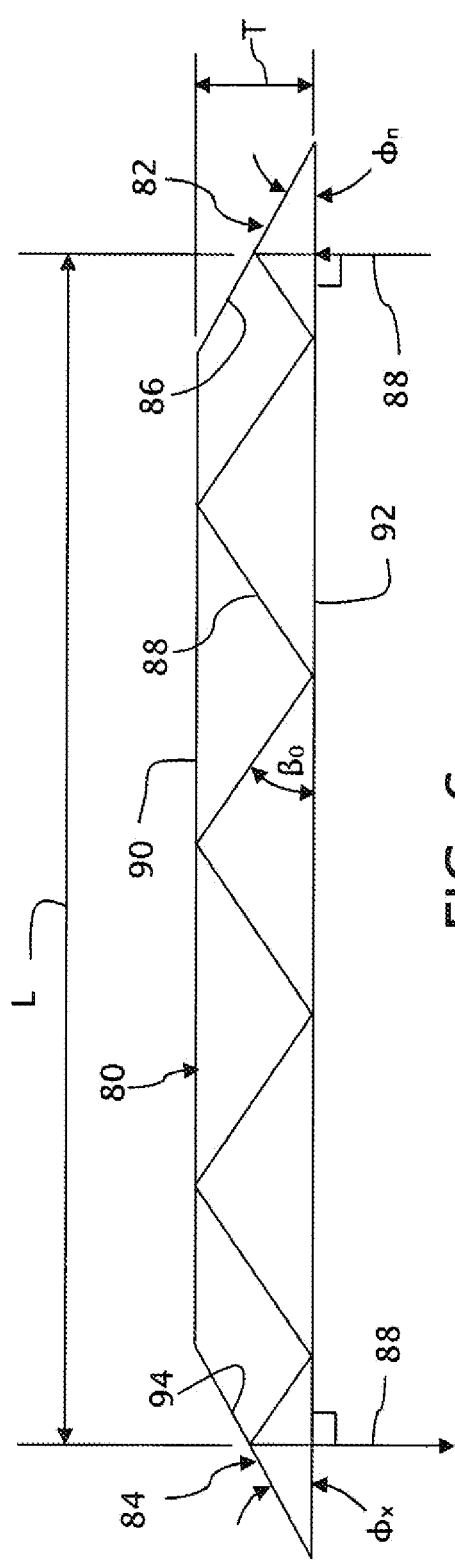
FIG. 6 is an enlarged diagram of a single waveguide for a near-eye display system extending between an input coupling and an output coupling for identifying design variables.

FIGS. 6-10 illustrate basic relationships within a single waveguide, which are presented as a basis for describing the further control possible with the specially arranged use of multiple waveguides. In FIG. 6, a single plane-parallel waveguide 80 is arranged with an input coupling 82 and an output coupling 84. The input coupling 82 has an at least partially reflective entrance facet 86 for injecting a beamlet 88 (depicted as a single ray representing a bundle of parallel rays) into the waveguide 80. The beamlet 88 propagates along the waveguide 80 by a mechanism of total internal reflection between plane parallel front surface 90 and back surface 92 of the waveguide 80 at a midrange grazing angle $\beta_0$. An at least partially reflective exit facet 94 of the output coupling 84 redirects the beamlet 88 out of the waveguide 80 in a direction that is normal to the front and back surfaces 90 and 92 of the waveguide 80.

The waveguide 80 has an overall thickness T and a nominal length L, which is taken at the mid-thickness of the waveguide 80. The entrance facet 86 is inclined to the back surface 92 through a facet angle $\phi_n$ and the exit facet 94 is inclined to the back surface 92 through a facet angle $\phi_x$. For balancing chromatic effects associated with the injection and ejection of light from the waveguide, the two facet angles $\phi_n$ and $\phi_x$ are preferably set equal.

Figure 7:
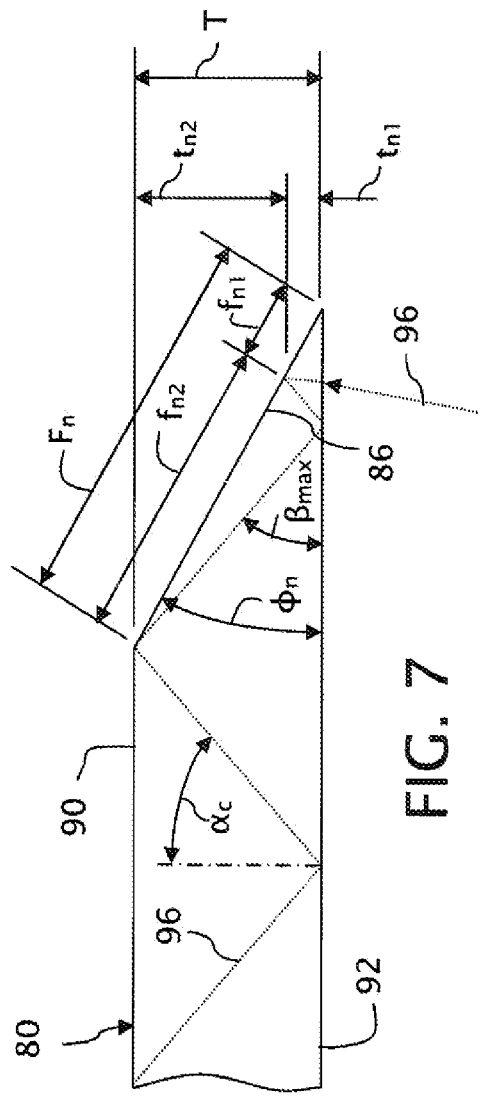
FIG. 7 is a further enlarged cut-away diagram of the single waveguide of FIG. 6 centered about the input coupling and showing the injection of a beamlet intended for propagation at a maximum grazing angle.

FIG. 7 illustrates a problem referred to as "double bouncing", which is particularly pronounced for beamlets intended for propagation at the highest grazing angles. For waveguides that support propagation by the mechanism of total internal reflection, the highest grazing angle $\beta_{max}$ as shown for the beamlet 96 (similarly depicted as a representative ray) is limited to the complement of the so-called critical angle $\alpha_c$ at which total internal reflection is supported at an optical interface. Given a refractive index $n_H$ of the waveguide material (e.g., an optical glass or plastic), and a lower refractive index $n_L$ of the surrounding medium (e.g., an optical adhesive or air), the critical angle is found as follows:

$$\alpha_c = \text{Sin}^{-1}\left(\frac{n_L}{n_H}\right) \tag{1}$$

The highest grazing angle $\beta_{max}$ is determined from the complement of the critical angle $\alpha_c$ as follows:

$$\beta_{max} = 90° - \alpha_c \tag{2}$$

Given a first point of reflection of the beamlet 96 at a length $f_{n1}$ along the entrance facet 86 at a thickness $t_{n1}$ (measured from the back surface 92) and a second reflection at a thickness $t_{n2}$ (measured from the thickness $t_{n1}$) with a distance $f_{n2}$ along the entrance facet 86 between the two reflections, a trigonometric relationship according to the Law of Sines can be defined as follows:

$$\frac{\frac{t_{n1}}{\text{Sin}(\beta_{max})}}{\text{Sin}(\beta_{max} - \phi_n)} = \frac{f_{n2}}{\text{Sin}(2\beta_{max})} \tag{3}$$

After reordering the terms, the distance $f_{n2}$ along the entrance facet 86 can be isolated as follows:

$$f_{n2} = \frac{t_{n1}\text{Sin}(2\beta_{max})}{\text{Sin}(\beta_{max})\text{Sin}(\beta_{max} - \phi_n)} \tag{4}$$

The distance the distance $f_{n2}$ along the entrance facet 86 stands in relation to the thickness $t_{n2}$ as follows:

$$t_{n2} = f_{n2}\text{Sin}(\phi_n) \tag{5}$$

By collecting terms in an intermediate value M, a relationship between the thicknesses $t_{n1}$ and $t_{n2}$ can be derived as follows:

$$t_{n2} = M t_{n1} \tag{6}$$

where the value for M is found as follows:

$$M = \frac{\text{Sin}(\phi_n)\text{Sin}(2\beta_{max})}{\text{Sin}(\beta_{max})\text{Sin}(\beta_{max} - \phi_n)} \tag{7}$$

Thus, the value M expresses a ratio of the thicknesses $t_{n1}$ and $t_{n2}$ associated with first and second reflections from the entrance facet 86. Given a total waveguide thickness T equal to the sum of the thicknesses $t_{n1}$ and $t_{n2}$, any rays that strike the entrance facet 86 at a thickness less than the thickness $t_{n1}$ and within the length $f_{n1}$, reflect a second time from the entrance facet 86 at a grazing angle that is diminished by two times the difference between the maximum grazing angle $\beta_{max}$ and the entrance facet angle $\phi_n$. Only portions of the beamlet 96 that first strike the entrance facet 86 along the length $f_{n2}$ propagate as desired at the maximum grazing angle $\beta_{max}$.

Double bouncing on the entrance facet 86 cannot be avoided by reducing the overall thickness T of the waveguide because the ratio between the thickness $t_{n1}$ and $t_{n2}$ remains constant. Increasing the prism facet angle $\phi_n$ changes the ratio between thicknesses $t_{n1}$ and $t_{n2}$ but does not entirely eliminate double bouncing unless the prism facet angle $\phi_n$ is larger than the maximum grazing angle $\beta_{max}$.

Figure 8:
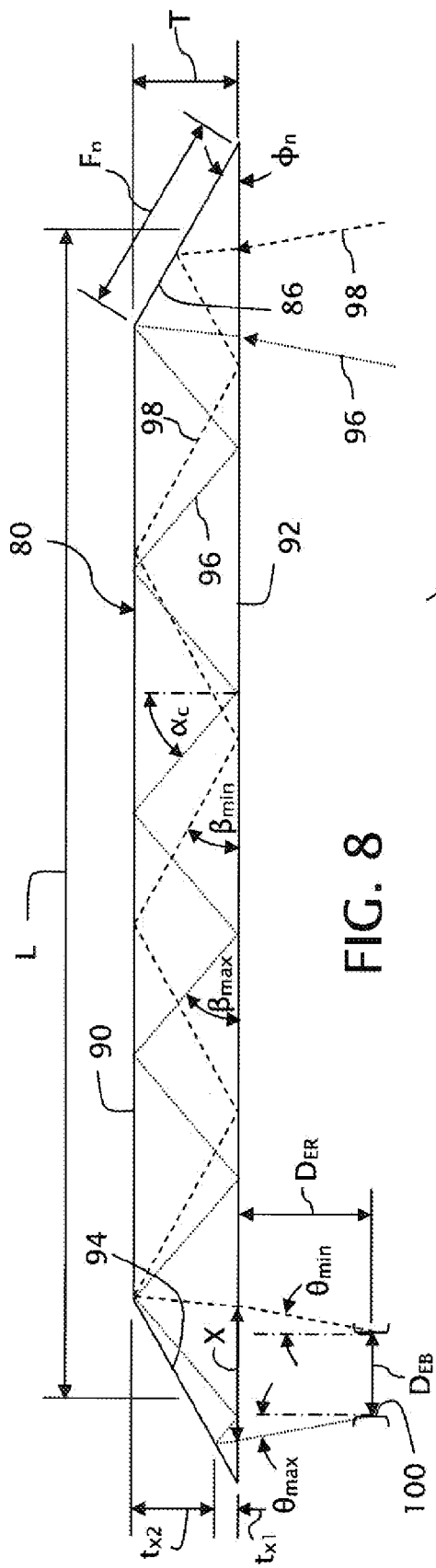
FIG. 8 is an enlarged diagram of the single waveguide of FIG. 6 showing the propagation of beamlets at both the maximum grazing angle and a minimum grazing angle.
Figure 9:
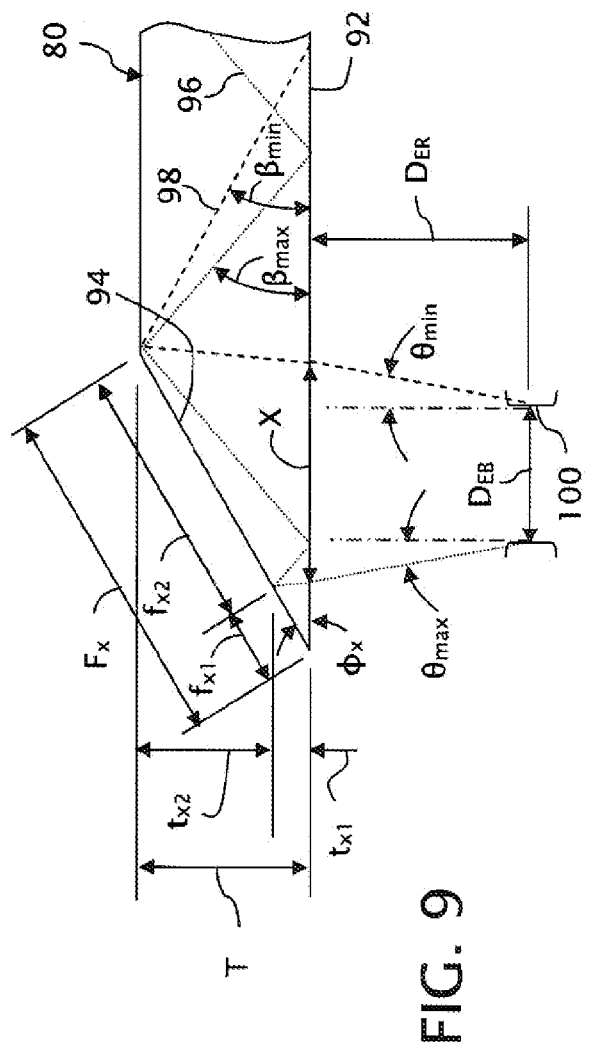
FIG. 9 is a further enlarged cut-away diagram of the single waveguide of FIG. 6 centered about the output coupling and showing the ejection of beamlets at both the maximum grazing angle and a minimum grazing angle.
Figure 10:
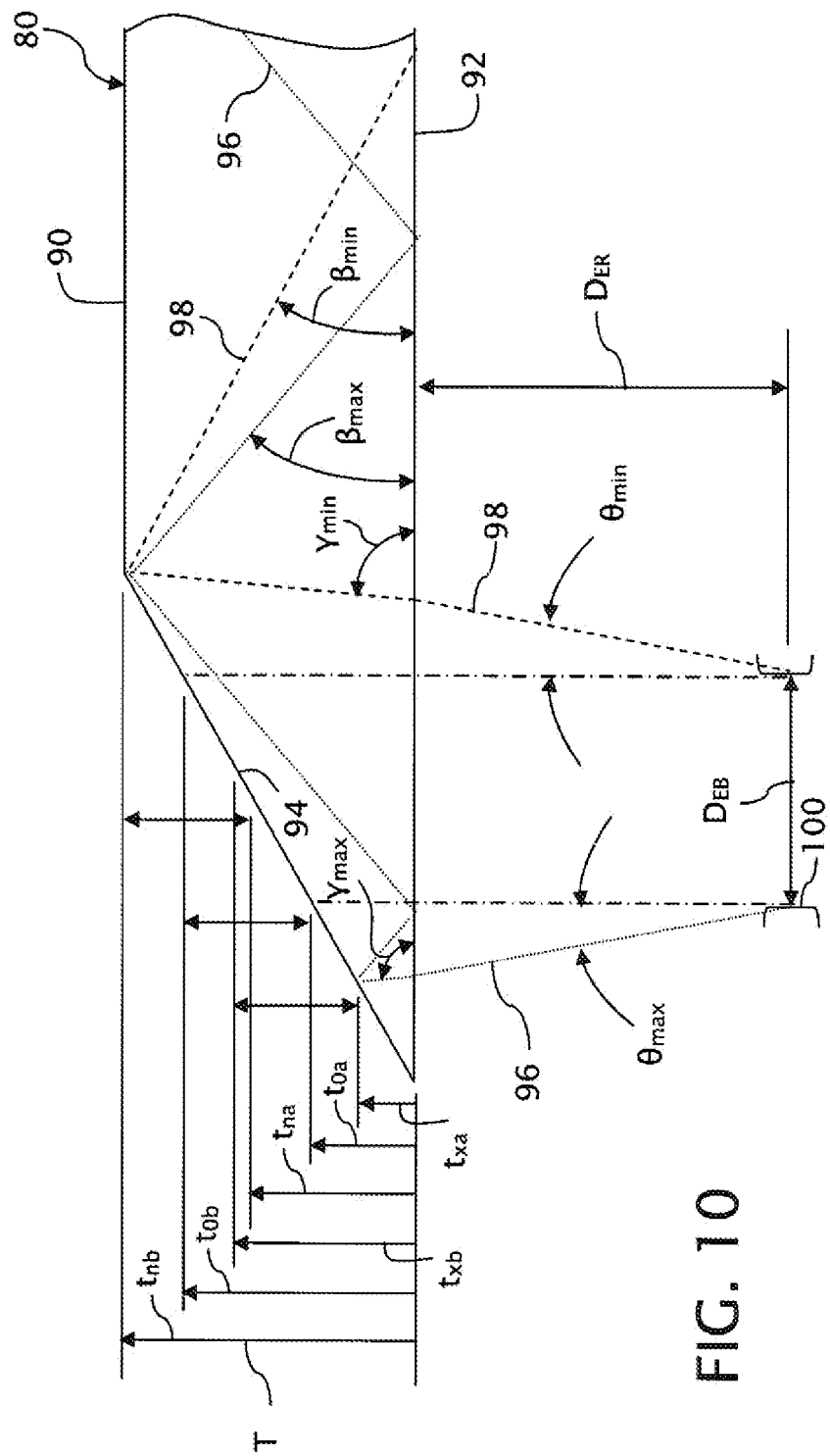
FIG. 10 is a yet further enlarged cut-away diagram of the single waveguide of FIG. 6 centered about the output coupling and showing thickness ranges within which the different grazing angle beamlets are ejected from the waveguide into a designated eyebox.

With reference to FIGS. 8-10, a problem complementary to the double-bounce problem at the entrance facet 82 occurs at the exit facet 94 because light propagating at the maximum grazing angle $\beta_{max}$ cannot reach portions of the exit facet 94. Again, assuming the entrance prism facet angle $\phi_n$ equals the exit prism facet angle $\phi_x$, the following equivalencies are evident.

$$t_{x1} = t_{n1} \quad (8)$$

$$t_{x2} = t_{n2} = M\,t_{x1} \quad (9)$$

Propagations at the maximum grazing angle $\beta_{max}$ cannot reach the exit facet 94 within the length $f_{x1}$ at waveguide thicknesses below $t_{x1}$. To avoid discontinuities in the reflection of the beamlet 96 along the exit facet length $f_{x2}$, the length L of the waveguide 80 can be set approximately according to the following relationship:

$$L \cong K \square T (\mathrm{Cotan}\,\beta_{max} + \mathrm{Cotan}\,\phi) \quad (10)$$

or a little less within a fraction of the distance $T \cdot \mathrm{Cotan}\,(\beta_{max})$.

By increasing the exit facet angle $\phi_x$ so as to approach the maximum grazing angle $\beta_{max}$, more of the exit facet 94 is usable by the beamlet 96 propagating at the maximum grazing angle $\beta_{max}$. However, the exit facet angle $\phi_x$ should not be larger than a minimum grazing angle $\beta_{min}$ at which a beamlet 98 propagates along the waveguide 80 to avoid stray reflections of light approaching the exit facet 94 from the front surface 90 of the waveguide 80. (Note: Only the light approaching the exit facet 94 from the back surface 92 is reflected from the waveguide 80 in a direction intended for filling an eyebox 100.) Thus, to provide a wider range of angles ($\beta_{min}$-$\beta_{min}$) for representing a desired angular field of view, the smallest grazing angle $\beta_{min}$ is set equal the exit facet angle $\phi_x$ as follows:

$$\beta_{min} = \phi_x \quad (11)$$

Under normal circumstances, i.e., unless the waveguide 80 is to be tipped in front of the viewer, the midrange grazing angle $\beta_0$ is expected to exit the waveguide 80 normal to the plane parallel front and back surfaces 90 and 92. Assuming as such, the following relationships are evident:

$$\beta_0 = 90 - 2\phi_x \quad (12)$$

$$\beta_0 = (\beta_{max} + \beta_{min})/2 \quad (13)$$

Given these requirements for the midrange grazing angle $\beta_0$ set forth in relationships (12) and (13) above, the following further relationships can be derived.

$$\beta_{min} = \phi_x = (90 + \alpha_c)/5 \quad (14)$$

$$\beta_{max} = (90 - \alpha_c) = 180 - 5\beta_{min} \quad (15)$$

After reflection from the exit facet 94, the grazing angles change from $\beta_{max}$ to $\gamma_{max}$ and $\beta_{min}$ to $\gamma_{min}$ according to the following relationships.

$$\gamma_{max} = \beta_{max} + 2\phi_x \quad (16)$$

$$\gamma_{min} = \beta_{min} + 2\phi_x \quad (17)$$

Refraction occurs at the back surface 92 of the waveguide 80 for rays reflecting from the waveguide 80 according to Snell's law.

$$n_H \sin(\gamma_{max} - 90) = n_A \sin(\theta_{max}) \quad (18)$$

$$n_H \sin(\gamma_{min} - 90) = n_A \sin(\theta_{min}) \quad (19)$$

Assuming the rays exit into air with an index or refraction equal to unity, the maximum and minimum field angles $\theta_{max}$ and $\theta_{min}$ can be determined as follows.

$$\theta_{max} = \sin^{-1}(n_H \sin(\gamma_{max} - 90)) \quad (20)$$

$$\theta_{min} = \sin^{-1}(n_H \sin(\gamma_{min} - 90)) \quad (21)$$

As derived above, the limit grazing angles $\beta_{max}$ and $\beta_{min}$, the prism facet angle $\phi_x$, and the field angles $\theta_{max}$ and $\theta_{min}$ can all determined from the critical angle $\alpha_c$, which is itself determined from the given refractive indices $n_H$, $n_L$ of the waveguide material and the material adjacent the waveguide 80. By tipping the waveguide 80 in a direction toward the viewer's eye (or other such compensating adjustment), the assumption regarding the middle grazing angle $\beta_0$ exiting normal to the posterior surface of the waveguide can be changed. A shallower prism facet angle $\phi_x$ adds to the range of the field of view, although the field is tipped.

The problem relating to double reflections from the entrance facet 86 can also be traced to the critical angle $\alpha_c$. Assuming that the entrance facet angle $\phi_n$ is equal to the exit facet angle $\phi_x$, the ratio M is also ultimately based of the critical angle $\alpha_c$, since both the prism facet angle $\phi_x$ and the maximum grazing angle $\beta_{max}$ are also based on the critical angle $\alpha_c$.

A change between the prism facet angles $\phi_n$ and $\phi_x$ of entrance and exit facets 86 and 94 will generally require dispersion compensation since the beamlets would no longer enter and exit the waveguide 80 at the same angles. Given an entrance prism facet angle $\phi_n$ equal to $\beta_{max}$, a field angle $\theta_{n0}$ of the midrange beam 88 would be calculated as follows:

$$\theta_{n0} = \sin^{-1}[n_H \sin(\beta_0 + 2\phi_n - 90)] \quad (22)$$

To avoid the resulting dispersion by way of an additional compensating prism, a prism angle equal to $\theta_{n0}$ could be used.

A number of relationships can be developed to define the dimensions of the eyebox 100 as having a diameter $D_{EB}$ and an offset eye relief distance $D_{ER}$ from the waveguide 80. In this regard, a length along the back surface 92 of the waveguide 80 between the extreme positions of the maximum and minimum grazing angles $\beta_{max}$ and $\beta_{min}$ upon exiting the waveguide 80 is given as follows.

$$X = t_{x1}[\,\mathrm{Cot}(\gamma_{max}) - \mathrm{Cot}(\gamma_{min})] + t_{x2}[\,\mathrm{Cot}(\phi_x) - \mathrm{Cot}(\gamma_{min})] \quad (23)$$

In consideration of the following intermediate values of N and P, as well as the earlier derived intermediate value M, the distance X can be more succinctly defined in relation to the thickness $t_{x1}$.

Let:

$$N = \mathrm{Cot}(\gamma_{max}) - \mathrm{Cot}(\gamma_{min}) \quad (24)$$

$$P = \mathrm{Cot}(\phi_x) - \mathrm{Cot}(\gamma_{min}) \quad (25)$$

Therefore:

$$X = t_{x1}(N + M \cdot P) \quad (26)$$

Given values for the diameter $D_{EB}$ of the eyebox 100 and the relief distance DEB of the eyebox 100 from the waveguide 80, the distance X can also be determined in accordance with the following relationship.

$$X = D_{EB} + 2D_{ER} \tan(\phi_x) \quad (27)$$

where $\theta_x$ is equal to the absolute value of both $\theta_{max}$ and $\theta_{min}$ as follows:

$$\theta_x = |\theta_{max}| = |\theta_{min}| \quad (28)$$

Given the two relationships for the same distance X, the value of the thickness $t_{x1}$ can be found as follows.

$$t_{x1} = \frac{D_{EB} + 2D_{ER}\text{Tan}(\theta_x)}{N + M \square P} \quad (29)$$

Having found the value for the thickness $t_{x1}$, the remaining values for thickness and distances along the exit facet 94 can also be found according to the following relationships.

$$f_{x2} = \frac{t_{x1}\text{Sin}(2\beta_{max})}{\text{Sin}(\beta_{max})\text{Sin}(\beta_{max} - \phi_x)} \quad (30)$$

$$f_{x1} = \frac{t_{x1}}{\text{Sin}(\phi_x)} \quad (31)$$

$$F_x = f_{x1} + f_{x2} \quad (32)$$

$$t_{x2} = f_{x2}\text{Sin}(\phi_x) \quad (33)$$

$$T = F_x\text{Sin}(\phi_x) = t_{x1} + t_{x2} \quad (34)$$

Thus, once (a) the critical angle $\alpha_c$ is determined from the relevant indices, (b) the entrance and exit prism angles $\phi_n$ and $\phi_x$ are set equal, and (c) the eyebox 100 diameter $D_{EB}$ and relief distance $D_{ER}$ are chosen, the overall thickness T of the waveguide can be calculated.

As is apparent in FIGS. 8 and 9, the eyebox 100 is offset along the length L of the waveguide 80 a short distance from the prism exit facet 94 to account for the portion of the exit facet 94 along the length $f_{x1}$ that cannot be reached by rays propagating at the maximum grazing angle $\beta_{max}$. An offset distance OFD at which the eyebox 100 is shifted along the length L of the waveguide is given by the following relationship:

$$OFD = D_{ER}\text{Tan}\,\theta_{MAX} + t_{x1}(\text{Cot}\,\phi_x - \text{Cot}\,\gamma_{MAX}) \quad (35)$$

With particular reference to FIG. 10, it can be seen that individual propagating beamlets 96 and 98 at particular grazing angles are not required to fill the entire usable length $f_{x2}$ of the exit facet 94 to fill the eyebox 100. For the beamlet 88 propagating at the middle grazing angle $\beta_0$, the beamlet 88 is only required to encounter the exit facet 94 between thicknesses $t_{0a}$ and $t_{0b}$ as follows:

$$t_{0a} = t_{0b} - \text{Tan}(\phi_x)D_{EB} \quad (36)$$

$$t_{0b} = T - (\text{Tan}(\theta_x)D_{ER} + \text{Cot}(\beta_{min} + 2\phi_x)T)\text{Tan}(\phi_x) \quad (37)$$

For the beamlet 98 propagating at the minimum grazing angle $\beta_{min}$, the beamlet 98 is only required to encounter the exit facet 94 between thicknesses $t_{na}$ and $t_{nb}$ as follows:

$$t_{na} = T - \text{Tan}(\phi_x)D_{EB} \quad (38)$$

$$t_{nb} = T \quad (39)$$

For the beamlet 96 propagating at the maximum grazing angle $\beta_{max}$, the beamlet 96 is only required to encounter the exit facet 94 between thicknesses $t_{xa}$ and $t_{xb}$ as follows:

$$t_{xa} = \text{Sin}(\phi_x)f_{x1} \quad (40)$$

$$t_{xb} = t_{xa} + \text{Tan}(\phi_x)D_{EB} \quad (41)$$

Based in part upon this recognition that each different grazing angle beamlet, e.g., 88, 96, and 98, is only required to encounter a portion of the length of the exit facet 94 within a corresponding portion of the thickness (e.g., $t_{0a}$-$t_{0b}$, $t_{maxa}$-$t_{maxb}$, or $t_{mina}$-$t_{minb}$) of the waveguide 80, the invention contemplates the use of multiple waveguides for conveying different ranges of grazing angles within different waveguides and for distributing the different grazing angle ranges within the waveguides for at least partly reconstructing a pupil from the spatially offset beamlets.

As shown in FIG. 11, the waveguide 80 of FIGS. 6-10 has been replaced by a compound waveguide 110 comprising a posterior waveguide 112, and intermediate waveguide 114, and an anterior waveguide 116, which are cemented together by optical adhesive layers 118 and 120. The three waveguides 112, 114, and 116 are made from optical materials having a higher refractive index than the materials for forming the optical adhesive layers 118 and 120 to support the propagation of light by total internal reflection. Each of the waveguides 112, 114, and 116 also preferably has planeparallel front and back surfaces for propagating light at constant grazing angles.

An input coupling 122, which is shown without a prismatic waveguide expander but with reference to an at least partially reflective entrance facet 124, injects beamlets 126 and 128 at the maximum and minimum grazing angles $\beta_{max}$ and $\beta_{min}$ into different combinations of the waveguides 112, 114, and 116. For example, the minimum grazing angle beamlets 128 are injected into the posterior and intermediate waveguides 112 and 114 and the maximum grazing angle beamlets 126 are injected into the intermediate and anterior waveguides 114 and 116.

An output coupling 130, which is also shown without a prismatic waveguide expander but with reference to an at least partially reflective exit facet 132, ejects the beamlets 126 and 128 from the waveguides 112, 114, and 116 along converging pathways toward an eyebox 134 to at least partially reconstruct a pupil 136 against which the eyebox 134 is sized. Any light injected into the posterior waveguide 112 for propagating at the maximum grazing angle $\beta_{max}$ would eject wide to the left of the eyebox 134, and any light injected into the anterior waveguide 116 for propagating at the minimum grazing angle $\beta_{min}$ would eject wide to the right of the eyebox 134. Thus, for more efficiently overlapping the beamlets 126 and 128 within the eyebox 134, the different grazing angle beamlets 126 and 128 are confined to different combinations of the waveguides 112, 114, and 116. The beamlets 126 and 128 are spatially separated for injection into the compound waveguide 110 by locating the compound waveguide 110 offset from an aperture 138 of the image generator (not shown) through a distance $D_O$ so that the generated beamlets 126 and 128 intended for propagating at different grazing angles, e.g., $\beta_{max}$ and $\beta_{min}$, diverge through the offset distance $D_O$.

For the purpose of emphasizing the propagation of boundary rays of the pupil 136, the intermediate waveguide 114 is not shown entirely filled by the different grazing angle beamlets 116 and 128. In practice, however, it is preferred to fill any such waveguide 114 that is capable of conveying light propagating within the range of grazing angles into a portion of the pupil 136. Although some light may still be ejected outside the pupil 136, the amount of light so wasted is limited by the reduced thicknesses of the individual component waveguides 112, 114, and 116.

The position at which an injected ray reflects from the entrance facet 124 at an entrance end 140, 142, or 144 of one of the waveguides 112, 114, and 116 does not necessarily correspond to the position the same ray reflects at the exit facet 132 at a corresponding exit end 146, 148, or 150 of the same waveguides. Since the entrance and exit facets 124 and 132 are inclined by equal angles but in opposite directions, rays that strike progressively higher along each of the entrance ends 140, 142, or 144 tend to strike progressively lower along each of the corresponding exit ends 146, 148, or 150. However, with respect to rays that reach the bottommost portion of the exit ends 146, 148, or 150, progressively higher rays at the entrance ends 140, 142, or 144 restart a cycle at the topmost portion of the exit ends 146, 148, or 150. An out-of-phase relationship between the locations at which rays strike the entrance and exit ends 140, 142, or 144 and 146, 148, or 150 can be determined by the waveguide lengths $l_1$, $l_2$, or $l_3$, the waveguide thicknesses $t_1$, $t_2$, or $t_3$, and the grazing angles, e.g., $\beta_{max}$ or $\beta_{min}$, at with the beamlets 126 and 128 propagate along the waveguides:

$$A_O = \frac{l \bmod (t \cot \beta) 2\pi}{t \cot \beta} \quad (42)$$

where $A_O$ is the angular phase offset at which rays of grazing angle $\beta$ strike the entrance and exit ends 140, 142, or 144 and 146, 148, or 150 of the waveguides 112, 114, and 116.

While the lengths $l_1$, $l_2$, and $l_3$, and the thickness $t_1$, $t_2$, or $t_3$ of the corresponding waveguides 112, 114, and 116 can be set so that a limited range of grazing angle beamlets remain in a desired phase relationship between the entrance ends 140, 142, or 144 and exit ends 146, 148, or 150 of the waveguides 112, 114, and 116, the individual waveguides 112, 114, and 116 should generally be filled (i.e., light reaching all points along the entrance ends 140, 142, or 144) when otherwise necessary to assure that the light reaches the desired contiguous areas at the exit ends 146, 148, or 150 of the same waveguides 112, 114, and 116.

FIG. 12 depicts an alternative compound waveguide 160 assembled from four individual plane-parallel waveguides 162, 164, 166, and 168 joined by three intervening layers of optical adhesive 170, 172, and 174. Once again, similar principles apply to (a) the injection of beamlets, e.g., beamlets 176 and 178, into the waveguides 162, 164, 166, and 168, (b) propagation of the beamlets 176 and 178 along the waveguides 162, 164, 166, and 168, and (c) ejection of beamlets 176 and 178 from the waveguides 162, 164, 166, and 168 as described for the individual waveguides discussed above.

The overall thickness T of the compound waveguide 160 is set in relation to an intended pupil/eyebox 180 so that the pupil/eyebox 180 is filled by any grazing angle beamlet propagating between the grazing angles $\beta_{max}$ or $\beta_{min}$ that fills an appropriate combination of adjacent waveguides 162, 164, 166, and 168, which for any one beamlet is less than all four of the waveguides 162, 164, 166, and 168.

In the compound waveguide of FIG. 12, the beamlets 176 and 178 associated with the maximum and minimum grazing angles $\beta_{max}$ and $\beta_{min}$ are only required to fill adjacent pairings of the waveguides. For example, the maximum grazing angle beamlet 176 is arranged for filling only a posterior waveguide 162 and a first intermediate waveguide 164, and the minimum grazing angle beamlet 178 is arranged for filling only a second intermediate waveguide 166 and an anterior waveguide 168. The arrangement for filling the selected waveguides 164, 164 and 166, 168 includes both dimensioning an aperture 182 of an image generator (not shown) and positioning the aperture 182 at an offset distance $D_O$ from the compound waveguide 160 to effect a desired spatial separation between the beamlets 177 and 178 at an entrance facet 184 of the compound waveguide 160. For simplicity, the aperture 182 is dimensioned with respect to only the boundary rays of the beamlets 176 and 178 at the pupil/eyebox 180, but in practice, the aperture 182 should be wider to completely fill each of the paired waveguides 162, 164 and 166, 168 with intermediate rays of the beamlets 176 and 178 that propagate out of phase between the entrance and exit ends of the individual waveguides 162, 164 and 166, 168. In other words, individual rays of the beamlets 176 or 178 that reflect from contiguous areas of an exit facet 186 for filling the pupil/eyebox 180 do not necessarily reflect from contiguous areas of the entrance facet 184. Thus, if at least some rays propagating at a particular grazing angle $\beta$ within one of the waveguides 162, 164, 166, and 168 are required for filling the pupil/eyebox 180, then, unless resolved by ray tracing or other investigative tool, the entire waveguide 162, 164, 166, or 168 should be filled to be certain that the rays reach the pupil/eyebox 180. Conversely, if none of the rays propagating at a particular grazing angle $\beta$ within one of the waveguides 162, 164, 166, or 168 are required for filling the pupil/eyebox 180, then the overall width of the beamlet can be limited to exclude the generation and propagation of such rays.

The range of thicknesses within the compound waveguide 160 at which individual beamlets, e.g., the beamlets 176 and 178, propagating at particular grazing angles $\beta_{max}$ and $\beta_{min}$ are required to occupy along an exit facet 186 of the compound waveguide 160 for filling the pupil/eyebox 180 can be determined from ray tracing or the equations (36)-(41) as explained above. The individual waveguide thicknesses $t_1$, $t_2$, $t_3$, and $t_4$ can all be equal and the different beamlets divided among the pairings 162 and 164, 164 and 166, or 166 and 168, or the individual waveguide thicknesses $t_1$, $t_2$, $t_3$, and $t_4$ can vary to better accommodate distinct angular ranges of the beamlets. For example, the thickness $t_1$ of the anterior waveguide 178 can be relatively increased to compensate for the portion of the waveguide thickness $t_1$ that is unreachable by the rays of the highest grazing angle $\beta_{max}$ set by the ratio M of the usable to unusable portions of the anterior waveguide 178.

For example, the thickness of the anterior waveguide 178 can be set according to the following relationship:

$$t_1 = \left(\frac{1+M}{M}\right)\left(\frac{t_{xb} - t_{xa}}{2}\right) \quad (43)$$

where the expression $(t_{xb}-t_{xa})/2$ is equal to one half of the portion of the thickness of the compound waveguide 160 required for filling the pupil/eyebox 180 with the highest grazing angle beamlet 176.

Figure 13:
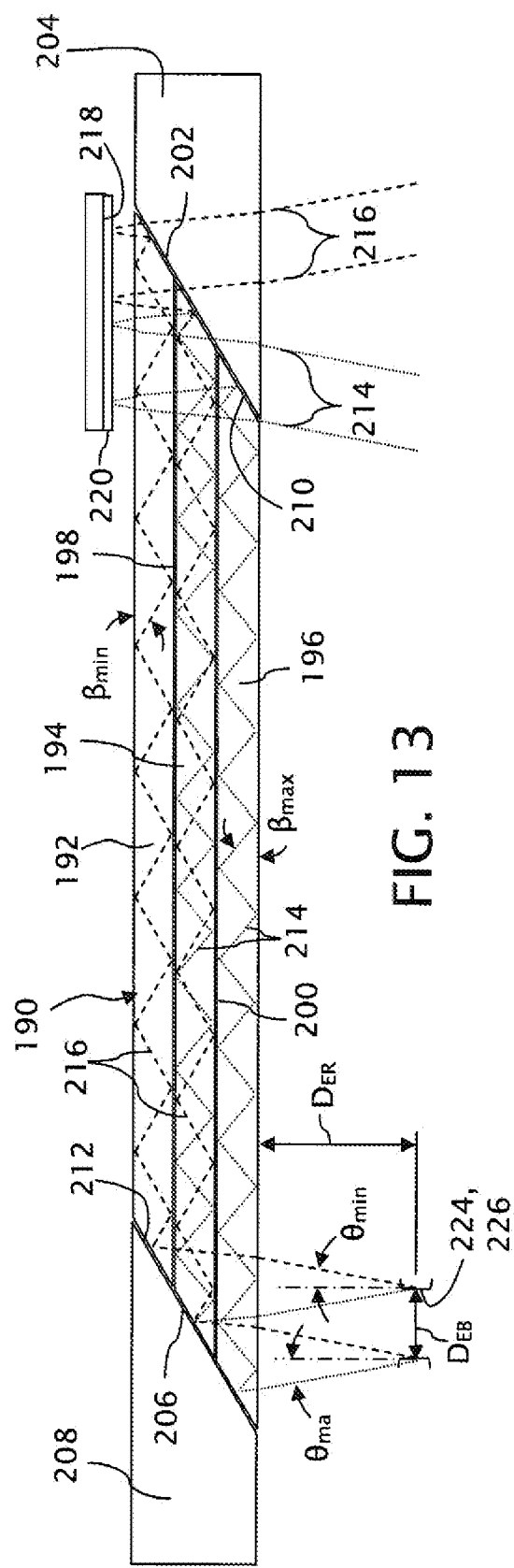
FIG. 13 is a diagram of an alternative compound waveguide of a near-eye display system with an input coupling for injecting light into the individual waveguides from an opposite side of the compound waveguide.

Another exemplary compound waveguide 190 for a near-eye display system is depicted in FIG. 13. The compound waveguide 190 includes a posterior waveguide 192, and intermediate waveguide 194, and an anterior waveguide 196. An optical adhesive layer 198 joins the posterior waveguide 192 to the intermediate waveguide 194, and an optical adhesive layer 200 joins the anterior waveguide 196 to the intermediate waveguide 194. An optical adhesive layer 202 bonds a prismatic waveguide extender 204 to the entrance ends of the three waveguides 192, 194, and 196, and an optical adhesive layer 206 bonds a prismatic waveguide extender 208 to the exit ends of the three waveguides 192, 194, and 196. A partially reflective entrance facet 210 formed on a mating surface of the prismatic waveguide extender 204 provides a common partially reflective entrance end face for the three waveguides 192, 194, and 196. Similarly, a partially reflective exit facet 212 formed on a mating surface of the prismatic waveguide extender 208 provides a common partially reflective exit end face for the three waveguides 192, 194, and 196.

While the three waveguides 192, 194, and 196 and the two prismatic waveguide extenders 204 and 208 can be made of substantially the same optical materials, which preferably exhibit a high refractive index, the optical adhesive layers 198 and 200 that bond the three waveguides 192, 194, and 196 together preferably differ from the optical adhesive layers 202 and 206 that bond the prismatic waveguide extenders 204 and 208 to opposite ends of the waveguides 192, 194, and 196. The optical adhesive layers 198 and 200 preferably have a much lower refractive index than the refractive index of the waveguides 192, 194, and 196, whereas the optical adhesive layers 202 and 206 preferably have the same refractive index as the refractive index of the waveguides 192, 194, and 196 and the prismatic waveguide extenders 204 and 208. The lower refractive index of the optical adhesive layers 198 and 200 supports total internal reflection within the waveguides 192, 194, and 196. The matching refractive index of the optical adhesive layers 202 and 206 allows for the substantially unrefracted passage of light through between each of the prismatic waveguide extenders 204 and 208 and local portions the waveguides 192, 194, and 196. Preferably, both the prismatic waveguide extenders 204 and 208 and the waveguides 192, 194, and 196 include plane-parallel front and back surfaces and the total optical thickness of the three waveguides 192, 194, and 196 matches the thicknesses of the prismatic waveguide extenders 204 and 208 so that collectively, the three waveguides 192, 194, and 196 and the two prismatic waveguide extenders 204 and 208 form the equivalent of a single plane-parallel plate with respect to the through passage of light.

The partially reflective entrance facet 210 is preferably a polarizing beamsplitter, such as a wire grid polarizer as supplied by Moxtek, Inc. of Orem, Utah. Beamlets 214 and 216, which are representative of a range of angularly distinguishable beamlets, originate within an image generator (not shown), are directed on paths toward the compound waveguide 190. The linearly polarized beamlets 214 and 216 propagate through the three waveguides 192, 194, 196, the partially reflective entrance facet 210 and the entrance waveguide extender 204 en route to a reflective optic 218, which can include optical power, for reflecting the beamlets 214 and 218 on converging paths to the entrance facet 210. A quarter-wave plate 220, which is located in advance of the reflective optic 218, rotates the polarization of the beamlets 214 and 216 into an orthogonal polarization (in view of encounters with the beamlets en route to and from the reflective optic 218) for reflection from the entrance facet 210.

In contrast to the preceding embodiments, the image generator together with the reflective optic 218 forms a virtual pupil beyond the entrance facet 210. Thus, the beamlets 214 and 216 are spatially separated at the entrance facet 210 while converging toward a pupil rather than while diverging from a pupil. The spatial separation between the beamlets 214 and 216 at the entrance facet 210 confines the beamlet 214 to the intermediate waveguide 194 and the posterior waveguide 196 and confines the beamlet 216 to the anterior waveguide 192 and the intermediate waveguide 194.

After propagating along the waveguides 192, 194, and 196 at the maximum and minimum grazing angles $\beta_{max}$ and $\beta_{min}$, the beamlets 214 and 216 reflect from the partially reflective exit facet 212 on converging paths that meet at an eyebox 224 and form a pupil 226 that is dimensioned commensurate with the eyebox 224. Even though neither of the beamlets 214 and 216 fills all three waveguides 192, 194, and 196, and each of the beamlets 214 and 216 fills a different combination of the waveguides, e.g., 194, 196 and 192, 194, the intended eyebox 224 is entirely filled. Although not shown, it is envisioned that beamlets propagating at or near the midrange grazing angle $\beta_0$ are required to fill only the intermediate waveguide 194 for also substantially filling the eyebox 224.

The partial reflectivity of the exit facet 212 is preferably formed by layers of dielectric materials that are sensitive to reflection within the intended range of beam frequencies (i.e., colors) and within the intended range of grazing angles from $\beta_{max}$ and $\beta_{min}$ but are relatively insensitive to or at least less sensitive to other wavelengths and incident angles such as from light proceeding from the ambient environment to the eyebox 224 through the through the exit waveguide extender 208, the partially reflective exit facet 212, and the three waveguides 192, 194, 196. The partial reflectivity of the exit facet 212 could be provided by a polarization beam splitter for more efficiently directing the propagating beamlets 214 and 216 to the eyebox 224, but the dielectric coatings can be arranged to better transmit light from the ambient environment while still effectively reflecting the propagating beamlets 214 and 216 to the eyebox 224.

The waveguides 192, 194, and 196, like the waveguides of the preceding embodiments, are preferably formed from plane-parallel plates that are held to parallelism within a few arc seconds (e.g., five arc seconds). The layers 198 and 200 of optical adhesive, like the layers of optical adhesive disclosed for the preceding embodiments, can be used to bond the plane parallel plates together. Once bonded together, the entrance ends of the waveguides 192, 194, and 196 can be collectively formed (e.g., ground and polished) to a common angle (i.e., the entrance facet angle $\phi_n$) and within a common plane, and the exit ends of the waveguides 192, 194, and 196 can also be collectively formed to a common angle (i.e., the exit facet angle $\phi_x$) and within a common plane. A requirement for parallelism between the waveguides 192, 194, and 196 is much less than the requirement for parallelism between the front and back surfaces of the individual waveguides 192, 194, and 196 because the effect of errors in the parallelism between the front and back surfaces of the individual waveguides 192, 194, and 196 are amplified by the multiple internal reflections of the beamlets 214 and 216 within the waveguides 192, 194, and 196. The beamlets 214 and 216 or portions thereof are isolated within the individual waveguides 192, 194, and 196 (i.e., the internal reflections at the prescribed grazing angles do not traverse multiple waveguides) and outside the waveguides 192, 194, and 196, the beamlets 214 and 216 are divided among the waveguides or combined from the waveguides by the at least partially reflective facets 210 and 212 that are common to all three waveguides 192, 194, and 196. Any errors attributable to errors in parallelism between the waveguides 192, 194, and 196 are evident largely upon the encounters with the entrance and exit facets 210 and 212, which are individual external reflections rather than a series of internal reflections. As a result, the tolerance for parallelism between the waveguides 192, 194, and 196 can be expanded with respect to the tolerance for parallelism between front and back surfaces of the individual waveguides 192, 194, and 196 by a factor substantially equal to the different numbers of reflective encounters that contribute to angular errors in the propagation of the beamlets 214 and 216, which can be a factor of 10 or more.

The prismatic waveguide extenders 204 and 208, which also preferably have plane parallel front and back surfaces, include mating facets that are inclined by a supplement of the entrance and exit facet angles $\phi_n$ and $\phi_x$. The partially reflective entrance and exit facets 210 and 212 are preferably formed on the mating facets of the prismatic waveguide extenders 204 and 208 to maximize flatness, parallelism, and angular orientation of the facets 210 and 212 with respect to all three waveguides 192, 194 and 196. The optical adhesive layers 202 and 206 bond the prismatic waveguide extenders 204 and 208, including the entrance and exit facets 210 and 212, to the opposite ends of the waveguides 192, 194, and 196. The optical adhesive layers 202 and 206 are index matched to the waveguides 192, 194, and 196 to eliminate reflections from the actual ends of the waveguides 192, 194, and 196 and are also index matched to the prismatic waveguide extenders to avoid reflections or refractions of the light passing through the waveguides 192, 194, and 196 and the prismatic waveguide extenders 204 and 208. At the entrance end, the beamlets 214 and 216 are required to pass through the waveguides 192, 194, and 196 and the entrance waveguide extender 204 without significant changes that could aberrate the intended image. At the exit end, the waveguides 192, 194, and 196 and the exit waveguide extender 208, should allow for the unaberrated passage of light from the ambient environment to the eyebox 224.

Although layers of optical adhesive are disclosed as a preferred way to assemble individual waveguides into compound waveguides, the individual waveguides could be separated by air gaps to provide a larger refractive index difference between the waveguides and the optical medium between them and bonding between the waveguides could be limited to more discrete points. Carefully calibrated beads or other spacers could be inserted between the waveguides to maintain desired separations and parallel orientations between the waveguides.

Although the image generator as described in particular for the embodiment of FIGS. 1-4 is based generally on a spatial light modulator, similar image generation can be performed by angular scanning techniques. Two-dimensional scanning mirror systems (e.g., mirrors rotatable about two orthogonal axes) can be used in combination with synchronized light sources (usually lasers) for generating two-dimensional images. Alternatively, one-dimensional scanning mirror systems (e.g., mirrors rotatable about a single axis) can be used in combination with synchronized one-dimensional image generators (e.g., linear arrays) for generating two-dimensional images. These or other forms of image generation can be incorporated into the various embodiments of the invention for producing near-eye displays.

These and other variations in the implementation of the invention will become apparent to those of skill in the art consistent with the overall teaching of this invention.

The invention claimed is:

1. A near-eye display for displaying virtual images comprising
   an image generator for generating angular transforms of the virtual images intended for display as angularly related beamlets representing different spatially related points in the images,
   a plurality of different waveguides that convey the angularly related beamlets toward an eyebox,
   an input coupling for injecting the angularly related beamlets into the waveguides for propagation along the waveguides,
   an output coupling for ejecting the angularly related beamlets from the waveguides toward the eyebox,
   each of the plurality of different waveguides having a front surface and a back surface, a thickness between the front and back surfaces, and a length that extends between the input coupling and the output coupling,
   the input coupling being optically spaced from the image generator for injecting different angular ranges of the angularly related beamlets into the different waveguides so that each of the different waveguides conveys a different region of the intended virtual images,
   each of the different waveguides being spatially offset from one another in a direction normal to the front and back surfaces of the different waveguides for separately propagating a different one of the different angular ranges of the angularly related beamlets along the length of each of the different waveguides between the input and output couplings, and
   the output coupling being oriented for ejecting the different angular ranges of the beamlets from the different waveguides on converging paths toward the eyebox into positions of increasing spatial overlap.

2. The display of claim 1 in which the output coupling converges the different angular ranges of the beamlets toward the eyebox without contributing optical power affecting an angular magnification of the virtual images.

3. The display of claim 1 in which the image generator includes an aperture within which the angular transforms of the virtual images overlap and the optical spacing between the input coupling and the image generator positions the aperture of the image generator at an optical distance from the input coupling so that the angularly related beamlets are partially spatially separated at the input coupling.

4. The display of claim 3 in which the different angular ranges of the beamlets are distributed among the waveguides so that the convergence of the different angular ranges of the beamlets from the output coupling reduces the spatial separation between the angularly related beamlets within the eyebox.

5. The display of claim 1 in which the waveguides are optically isolated from one another for propagating the angularly related beamlets through a first range of grazing angles and are optically coupled to one another through a second higher range of grazing angles.

6. The display of claim 5 in which the waveguides include an anterior waveguide remote from the eyebox, a posterior waveguide proximate to the eyebox, and at least one intermediate waveguide located between the anterior waveguide and the posterior waveguide.

7. The display of claim 6 in which the input coupling injects the angularly related beamlets that propagate at the lowest grazing angle into the anterior waveguide without injecting the angularly related beamlets that propagate at the lowest grazing angle into the posterior waveguide, and the input coupling injects the angularly related beamlets that propagate at the highest grazing angle into the posterior waveguide without injecting the angularly related beamlets that propagate at the highest grazing angle into the anterior waveguide.

8. The display of claim 7 in which the input coupling injects the angularly related beamlets that propagate at both the lowest grazing angle and the highest grazing angle within the at least one intermediate waveguide.

9. The display of claim 1 in which (a) the thickness of each of the waveguides extends between plane-parallel front and back surfaces for supporting internal reflection of the angularly related beamlets and the length of each of the waveguides extends between an entrance end and an exit end, (b) the input coupling includes an at least partially reflective surface proximate to the entrance end of each of the substantially parallel waveguides, and (c) the output coupling includes an at least partially reflective surface proximate to the exit end of each of the substantially parallel waveguides.

10. The display of claim 9 in which the waveguides vary in thickness for filling the eyebox with a more uniform distribution of light from the angularly related beam lets.

11. The display of claim 9 in which at least one of the angularly related beamlets has a beam width subject to truncation by the input coupling, and the length of one of the waveguides is set in relation to its thickness so that the truncated portion of the beam width is not required for filling the eyebox.

12. The display of claim 9 in which the at least partially reflective surfaces proximate to the exit end of each of the substantially parallel waveguides are oriented at a common exit angle and located within a common plane.

13. The display of claim 10 in which the at least partially reflective surfaces proximate to the entrance end of each of the substantially parallel waveguides are oriented at a common entrance angle and located within a common plane.

14. The display of claim 13 in which the image generator generates the angular transforms of the virtual images in a plurality of colors, and the common entrance angle substantially equals the common exit angle for limiting chromatic aberrations of the virtual images.

15. A compound waveguide system for a near-eye virtual image display comprising
a plurality of at least three parallel waveguides arranged in a stack, each having a front surface and a back surface, a thickness between the front and back surfaces, an entrance end and an exit end joining the front and back surfaces, and a length extending between the entrance and exit ends,
an optical medium between adjacent pairings of the parallel waveguides within the stack for at least partially optically isolating the waveguides from one another for separately propagating different angular ranges of angularly related beamlets along the lengths of the parallel waveguides,
a prismatic input coupling arranged for injecting the different angular ranges of the angularly related beamlets into different ones of the parallel waveguides and including at least partially reflective surfaces at the entrance ends of the parallel waveguides that are oriented through a common entrance angle and located in a common plane that is inclined to the front and back surfaces of the waveguides, and
a prismatic output coupling arranged for ejecting the different angular ranges of the angularly related beamlets from the different plane parallel waveguides, including at least partially reflective surfaces at the exit ends of the parallel waveguides that are oriented through a common exit angle and located in a common plane that is inclined to the front and back surfaces waveguides.

16. The waveguide system of claim 15 in which the at least partially reflective surfaces at the exit ends of the parallel waveguides are partially transmissive, and further comprising a mating prismatic waveguide extender that compensates for refractive effects associated with transmissions through the partially reflective surfaces at the exit ends of the parallel waveguides.

17. The waveguide system of claim 16 in which the prismatic waveguide extender includes front and back plane-parallel surfaces that extend substantially parallel to the front and back plane-parallel surfaces of the plurality of waveguides and a prismatic surface that mates with the prismatic surfaces at the exit ends of the waveguides.

18. The waveguide system of claim 15 in which the waveguides include front and back surfaces that extend plane-parallel to each other at a first accuracy and extend plane-parallel between adjacent waveguides at a second accuracy that is less than the first accuracy by a factor of 10 or more.

19. The waveguide system of claim 15 in which the plurality of parallel waveguides have a first index of refraction and the optical medium separating the plurality of parallel waveguides from one another has a second index of refraction that is lower than the first index of refraction for supporting internal reflections between parallel surfaces of the waveguides through a first range of grazing angles and transmissions between the waveguides through the second range of grazing angles.

20. The waveguide system of claim 19 in which the optical medium separating the plurality of parallel waveguides is an optical adhesive that binds the parallel waveguides together.

21. A method of making a compound waveguide system for a near-eye virtual image display comprising steps of
assembling a plurality of waveguides into a stack in a form that at least partially optically isolates the waveguides from one another by locating an optical medium between adjacent pairing of the waveguides, each of the waveguides having an entrance end, an exit end, and plane parallel front and back surfaces that extend between the entrance end and the exit end for propagating angularly related beamlets by reflections from the plane parallel front and back surfaces from the entrance end to the exit end of each of the waveguides,
fashioning prismatic surfaces at the entrance ends of the waveguides so that each of the entrance ends is oriented in a common direction that is inclined to the plane parallel front and back surfaces of the waveguides, and
fashioning prismatic surfaces at the exit ends of the waveguides so that each of the exit ends is oriented in a common direction that is inclined to the plane parallel front and back surfaces of the waveguides.

22. The method of claim 21 including steps of appending a mating prismatic waveguide extender to the exit ends of the waveguides and forming a partially reflective surface at an interface between the mating prismatic waveguide extender and the prismatic surfaces at the exit ends of the waveguides.

23. The method of claim 22 in which the prismatic waveguide extender includes front and back plane-parallel surfaces and a prismatic surface, and including the step of orienting the prismatic waveguide extender so that the prismatic surface of the prismatic waveguide extender mates with the prismatic surfaces at the exit ends of the waveguides and the front and back plane-parallel surfaces of the prismatic waveguide extend substantially parallel to the front and back plane-parallel surfaces of the plurality of waveguides.

24. The method of claim 22 including steps of appending a second mating prismatic waveguide extender to the entrance ends of the waveguides and forming a partially reflective surface at an interface between the second mating prismatic waveguide extender and the prismatic surfaces at the entrance ends of the waveguides.

25. The method of claim 21 in which the step of assembling the plurality of waveguides includes bonding adjacent waveguides together with an optical adhesive having a refractive index that is lower than refractive indices of the adjacent waveguides.

* * * * *